United States Patent
Speer

[15] 3,665,822
[45] May 30, 1972

[54] MATERIALS WORKING MACHINE

[72] Inventor: Donald C. Speer, Glendale, Ariz.

[73] Assignee: D. C. Speer Construction Co.

[22] Filed: May 20, 1970

[21] Appl. No.: 39,111

[52] U.S. Cl. .......................................................... 94/50 R
[51] Int. Cl. ....................................................... E01c 19/26
[58] Field of Search ................. 94/50; 37/126, 129; 280/418; 180/22 D, 22 E

[56] References Cited

UNITED STATES PATENTS

| 2,585,117 | 2/1952 | Gurries | 94/50 UX |
| 3,260,179 | 7/1966 | Moreira | 94/50 |

Primary Examiner—Jacob L. Nackenoff
Attorney—Drummond, Cahill and Phillips

[57] ABSTRACT

A materials working machine adapted to compact various materials on roadways, parking lots, soil fills or the like wherein a first structure is pivoted in cantilever relation to a towing vehicle on a substantially vertical axis; a link means having forward end portions pivotally connected to said first structure; a roller frame pivotally connected with rearward portions of said link means, a materials working roller pivotally mounted on said roller frame and having a peripheral portion adapted to bear on the ground, transport wheels carried by a rearward portion of said roller frame; and elevating means adapted to raise and lower the forward portion of said roller frame alternately to cause said materials working roller to bear on the ground or to elevate it above the ground so as to carry said roller frame on said transport wheels; which transport wheels are adapted to function selectively as pneumatic rollers.

3 Claims, 5 Drawing Figures

INVENTOR.
DONALD C. SPEER
BY
*Drummond, Cahill & Phillips*
ATTORNEYS

Patented May 30, 1972

INVENTOR.
DONALD C. SPEER

BY Drummond, Cahill & Phillips

ATTORNEYS

MATERIALS WORKING MACHINE

Materials working machines such as soil and roadway compacting rollers having heretofore been transported on trucks or trailers to a working site, or such machines have included a compacting roller in connection with a truck or tractor as an inseparable part thereof. The prior art roller compactors which have been carried on separate trailers have required substantial time and equipment for loading and unloading relative to separate transporting vehicles. Machines wherein materials working rollers have been a part of a tractor or truck structure are very costly and highly specialized and are generally very slow in operation and must, therefore, be carried on separate transport vehicles. Accordingly, it will be appreciated that prior art materials working machines used for the purpose of compacting soil and roadways have generally required special trailers or transport vehicles for moving them from one area to another at which they are used in a highly specialized manner.

The present invention comprises a materials working machine which may function as a trailer in relation to a tractor vehicle and may readily be used as a roller compactor machine or may be actuated into position wherein it may readily act as a trailer. In this manner, the invention may be readily transportable on the highway or any roadway so that the machine of the invention may be moved conveniently and quickly from one job location to another. The material working machine of the invention comprises a frame which serves a dual purpose, namely, that of a materials working roller frame as well as a trailer frame which is provided with rubber tired transport wheels. The machine of the invention employed elevating mechanism alternately disposed to provide for pivotal movement of the roller frame thereof so as to cause the materials working roller to bear on the ground or to pivot the frame upwardly so that it is entirely supported on the transport wheels only.

The invention comprises a novel structure at the forward end thereof which is pivotally steerable about a vertical axis in relation to a tractor and is supported in cantilevered disposition therefrom. A link means, coupled to said structure, is pivotally connected to a roller frame and an elevating means carried by said structure is adapted to raise and lower a forward portion of the roller frame so as to alternately permit the materials working roller of the invention to bear on the ground or to elevate it from the ground and permit transport wheels carried by the roller frame to bear the load to the entire frame for transporting the invention as a trailer.

The invention comprises a very simple combination of elements including means for coupling a front end portion thereof in cantilevered pivotal relation to a tractor and means for elevating and lowering a roller frame at its forward end alternately to permit bearing of a connected materials working roller or transport wheels means on the ground. Link means pivotally connects the cantilevered structure at the forward end of the invention to an intermediate portion of the roller frame thereof in order to provide efficient towing of the roller frame while said cantilevered structure is pivoted about a vertical axis in relation to a towing vehicle or tractor.

Accordingly, it is an object of the present invention to provide a novel materials working machine for working materials with a compacting roller thereof and for alternately transporting the invention, on transport wheels thereof, from one location to another.

Another object of the invention is to provide a novel materials working machine having a roller frame with means coupling it to a tractor; said roller frame having a materials working roller and transport wheels in connection therewith so disposed that the materials working roller or the transport wheels may be alternately engageable with the ground without interfering with the operation of the other for the purpose of working material at the surface of the ground or for the purpose of transporting the roller frame with the materials working roller substantially elevated above the ground.

Another object of the invention is to provide a very simple and economical materials working machine which may be used for compacting soil or roadway areas and which does not require a special trailer for the transport thereof.

Another object of the invention is to provide a materials working machine having a roller frame on which is mounted a materials working roller and transport wheels; the frame being provided with means for elevating and lowering it at the forward end, the materials working roller being at the intermediate portion of the frame and the transport wheels being at the rearward portion of the frame whereby the materials working roller as well as the transport wheels may be engaged with the ground concurrently or the materials working roller or the transport wheels may independently support the frame during materials working operations or transportation respectively as desired.

Further objects and advantages of the invention may be apparent from the following specification, appended claims and accompanying drawings.

Figure 2:
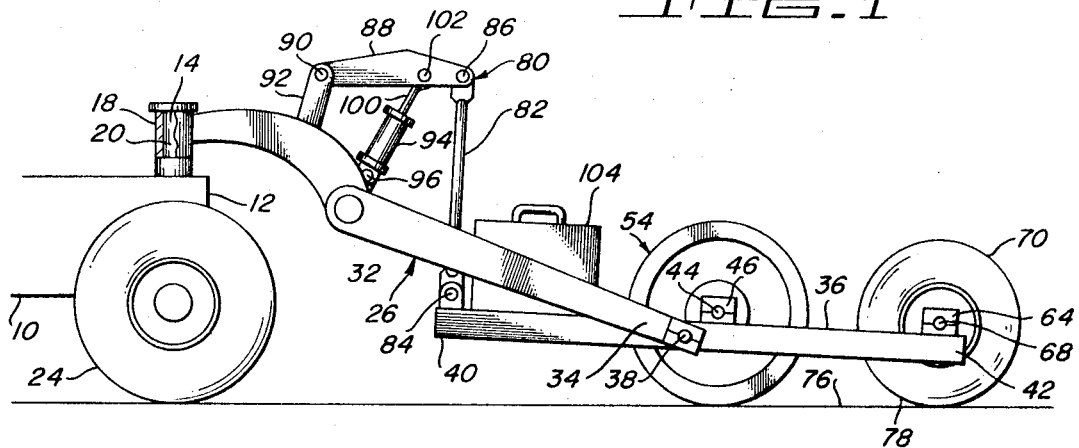
FIG. 2 is a side elevational view of the invention as shown in FIG. 1 of the drawings.
Figure 3:
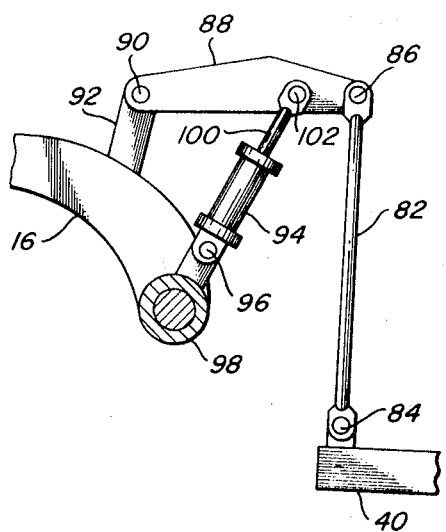
FIG. 3 is an enlarged fragmentary sectional view taken from the line 3–3 of FIG. 1.
Figure 4:
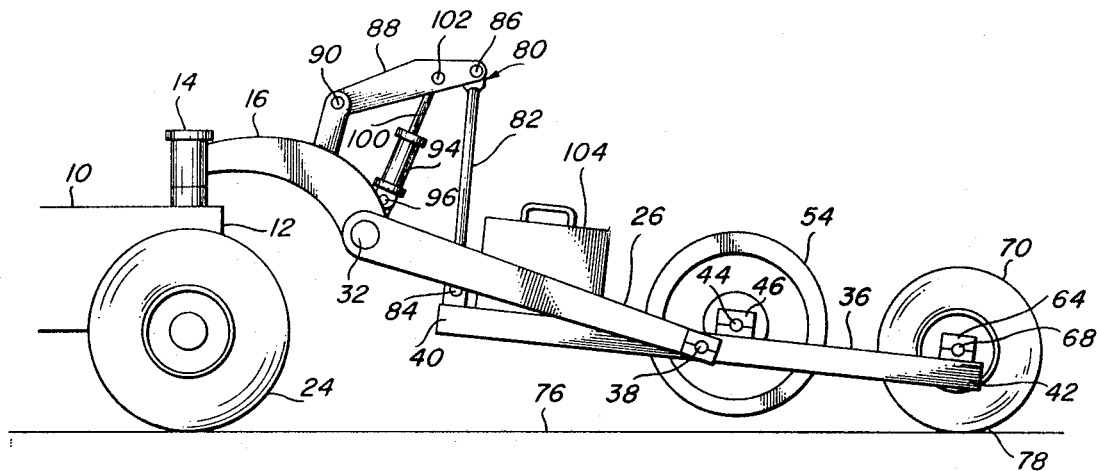
Figure 5:
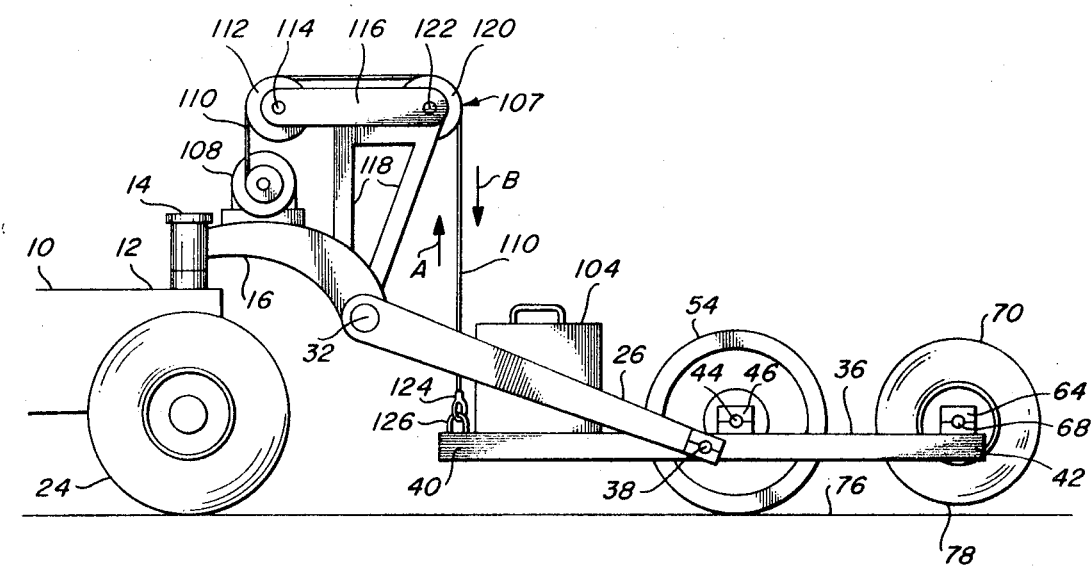

FIG. 4 is a view similar to FIG. 2 but showing a different operating position of the roller frame of the invention to hold the materials working roller of the invention above the ground so as to carry the roller frame of the invention on the transport wheels thereof; and FIG. 5 is a view similar to FIG. 2 but showing a modification of the invention and showing the roller frame thereof supported on the materials working roller and showing the transport wheels elevated above the ground.

Figure 1:
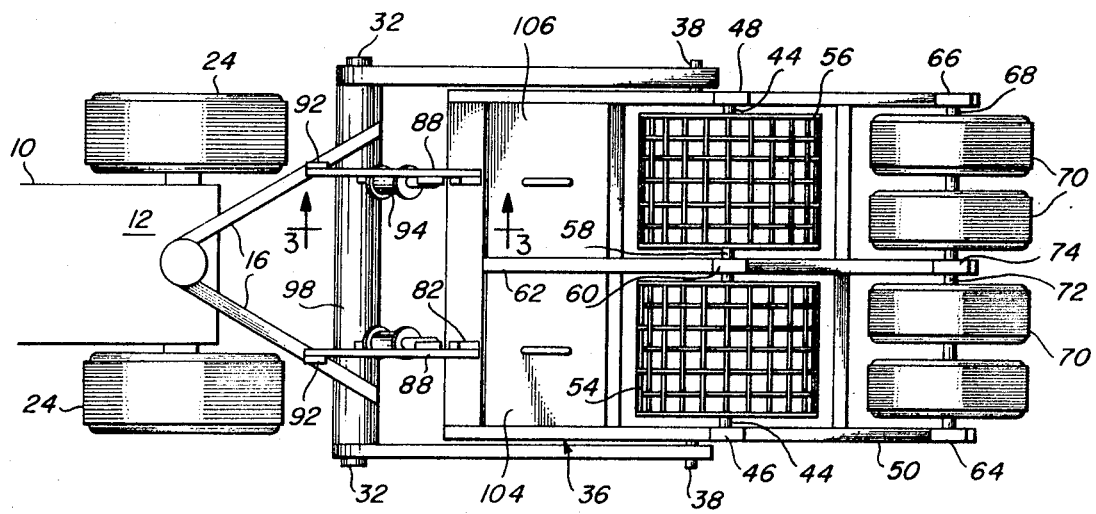
FIG. 1 is a top or plan view of the materials working machine of the invention shown pivotally coupled to a rearward end of a tractor vehicle.

As shown in FIGS. 1 and 2 of the drawings, the machine of the invention is towed by a tractor vehicle 10 having a rearward portion 12 which is provided with pivot bearing means 14 having a generally vertical axis and on which tongue structure 16 of the invention is pivotally mounted. The pivot bearing means 14 is rigidly connected to said rearward portion 12 of the tractor vehicle 10 and thereby supports the tongue structure 16 in a cantilevered relationship to the rearward portion 12 of the tractor vehicle 10. The tongue structure 16 is provided with a bearing sleeve 18 pivotally mounted on a vertical axis trunion portion 20 of the pivot bearing means and this pivot bearing means is provided with a cap 22 fixed to the trunion 20 for holding the bearing sleeve 18 downward and in position around the trunion portion 20 so as to permit the tongue structure 16 to pivot about a vertical axis but to be retained vertically on the trunion portion 20.

The tongue structure 16 serves as a steering tongue for the machine of the invention and is extended a substantial distance in a rearward direction from the rearward portion 12 of the tractor vehicle 10 so as to clear rear wheels 24 of said tractor vehicle 10. A link means 26 comprises a pair of link members 28 and 30 coupled, by a first pivotal structure 32, to said tongue structure 16. Thus, forward ends of the members 28 and 30 are pivotally mounted on horizontal axes to the tongue structure 16. Rearward portions 34 of the link members 28 and 30 are pivotally coupled to a roller frame 36 by means of second pivotal structures 38 which may be in the form of trunions carried by the roller frame 36. The roller frame 34 is provided with a forward portion 40 extending a considerable distance forwardly of the pivotal structures 38 and the roller frame 36 is provided with a rearward portion 42 extending a considerable distance rearwardly of the pivotal structures 38.

An axle 44 is mounted by bearings 46 and 48 at opposite sides 50 and 52 of the roller frame 36. Mounted on the axle 44 is a pair of materials working rollers 54 and 56 which may have peripheral structures in the form of grid elements or the peripheral structures may be conventional sheeps foot tampers or smooth arcuate surface structure.

The shaft 44, at an intermediate portion 58 thereof, is supported by a bearing 60 carried on an intermediate member 62 of the roller frame 36.

It will be seen that the axis of the axle 44, as shown in FIG. 2 of the drawings, is in close proximity or near to the pivotal structure 38 and that this pivotal structure 38, in connection with the link means 26, is nearer to the axle 44 than it is to the forward portion 40 of the roller frame 36 all as will be hereinafter described in detail.

Disposed on the rearward portion 42 of the frame of are bearings 64 and 66 which carry an axle 68 about which a plurality of transport wheels 70 are rotatably mounted.

The axle 66 at an intermediate portion 72 thereof is rotatably mounted by a bearing 74 carried by the intermediate portion 62 of the roller frame 36.

As shown in FIG. 2 of the drawings, a peripheral portion or structure of the materials working roller 54 is adapted to bear on the ground, indicated at 76, and the transport wheels 70 at their peripheral portions 78 are also adapted to bear on the ground 76 all as will be hereinafter described in detail.

An elevating means 80 is adapted to raise and lower the forward portion 40 of the roller frame 36. This elevating means 80 as shown in FIGS. 1 and 2 of the drawings, is provided with a pair of suspension rods 82 which are pivotally connected at their lower ends, to the forward portion 40 of the roller frame 36 by means of pins 84. Upper ends of the suspension rods 82 are pivoted, by means of pins 86, to extending ends of levers 88 which are pivotally mounted, by means of pins 90, to brackets 92 fixed to the tongue structure 16. A pair of hydraulic cylinders 94 are coupled, by means of pins 96, to a cross member 98 of the tongue structure 16. These cylinders 94 are provided with respective plungers 100 pivotally connected by pins 102 to the respective levers 88. Thus, extension or retraction of the plungers 100 will cause upward or downward pivotal movement of the levers 88 about the axes of the pins 90 and will cause the suspension rods 82 to move upwardly or downwardly and accordingly to raise or lower the forward portion 40 of the roller frame 36.

Carried on the roller frame 36 near its forward portion are weights 104 and 106. These weights are readily removable from the frame as desired.

As shown in FIG. 2 of the drawings, the elevating means 80 is disposed such that the suspension rods 82 maintain a forward portion 40 of the frame 36 in such position that peripheral portions of the materials working rollers 54 and 56 and the transport wheels 70 are all on the surface 76 of the ground.

As shown in FIG. 4 of the drawings, the plungers 100 of the hydraulic cylinders 94 are extended to a greater degree than they are in the position as shown in FIG. 2 of the drawings, whereby the suspension rods 82 are raised to a greater elevation and consequently, raising the forward portion 40 of the roller frame 36 to a greater elevation than that shown in FIG. 2. In the position shown in FIG. 4, the roller frame 36, at its forward end 40, is elevated sufficiently to maintain the peripheries of the materials working rollers 54 and 56 in spaced relation above the ground 76 and to thereby support the rearward portion 42 of the frame 36 entirely upon the peripheral portions 78 of the transport wheels 70. These transport wheels 70 are heavy duty truck tires or the like having rubber surfaces and therefore they are proper for transport of the roller frame 36 on various roadways. Thus, the machine of the invention as shown in FIG. 4, may be towed by the tractor vehicle 10 from one location to another or from one job sight to another on the transport wheels 70.

As shown in FIG. 5 of the drawings, the invention includes a modified elevating means designated 107. This elevating means comprises a winch 108 carried by the tongue structure 16. The winch 108 is provided with a cable 110 wound thereon and this cable 110 passes over a pulley 112 rotatably mounted on a shaft 114 carried by a bracket 116 having portions 118 coupled to the tongue structure 16 for rigidly supporting the bracket 116 in the position as shown in FIG. 5. The cable 110 also passes over a second pulley 120 rotatably mounted on a shaft 122 carried by the bracket 116. The cable 110 at a lower portion 124 thereof is coupled to an eye structure 126 fixed to the forward end 40 of the roller frame 36.

In the modified structure as shown in FIG. 5 of the drawings, the winch 108 is adapted to retract the cable 110 in the direction of an arrow "A" for raising the forward portion 40 of the roller frame 36, and when the winch 108 is operated in an opposite direction, the cable 110 is paid out in the direction of an arrow "B" to permit the weights 104 and 106 to lower the forward portion 40 of the roller frame 36. Thus, the roller frame 36 pivots about the axle 44 of the materials working rollers 54 and 56 to a degree such that the rearward portion 42 of the frame 36 is elevated sufficiently to move the peripheries 78 of the transport wheels 70 upwardly in spaced relation to the surface of the ground 76. It will be understood that the elevating means 80 as shown in FIGS. 2 and 4 of the drawings, may be operated such that the suspension rods 82 may be extended downwardly far enough to lower the forward portion 40 of the roller frame 36 to the position shown in FIG. 5, and therefore, the invention contemplates the operation of the materials working rollers 54 and 56 and the transport wheels 70 in all three positions as shown in FIGS. 2, 4, and 5 of the drawings.

In the position shown in FIG. 2, both the materials working rollers 54 and 56 and the transport wheels 70 are firmly engaged with the surface 76 of the ground and all of the materials working rollers and transport wheels may be used for rolling and compacting purposes, it being understood that the transport wheels may be weighted if desired. These wheels are provided with conventional automative heavy-duty truck tires which may be filled with heavy fluids if desired.

In the position as shown in FIG. 4 of the drawings, the transport wheels 70 only engage the ground and therefore support the roller frame 36 and also the materials working rollers 54 and 56 in elevated position above the surface of the ground so that the machine of the invention may be transported on a conventional roadway by being towed in relation to the tractor vehicle 10.

When the machine of the invention is operated as shown in FIG. 5 of the drawings, the forward end 40 of the roller frame 36 is lowered so as to elevate the transport wheels 70 into spaced relation above the surface 76 of the ground and this is accomplished by means of the weights 104 and 106 or may be accomplished by the structures shown in FIGS. 1 and 2 of the drawings by downward pressure of the suspension rods 82 alone or in connection with the weights 104 and 106.

When the roller frame 36 is in the position shown in FIG. 5 with the suspension wheels 70 spaced above the ground all the weight of the suspension wheels 70 as well as the force of the weights 104 and 106, is brought to bear on the materials working rollers 54 and 56 and thus, compacting force is fully concentrated on these materials working rollers.

It will therefore be seen that the materials working rollers 54 and 56 may be caused to bear lightly on the surface of the ground when operated in the position as shown in FIG. 2 with the transport wheels 70 bearing part of the load or the materials working rollers 54 and 56 may be caused to bear heavily on the surface of the ground when all of the weight of the weights 104, 106, and the weight of the transport wheels must be carried by the materials working rollers 54 and 56.

From the foregoing it will be appreciated by those skilled in the art, that the machine of the invention does not require a special trailer for carrying it and it is not a part of an expensive tractor or automative vehicle. The machine of the invention is a simple structure primarily of a trailer type and operable as a materials working machine or a transport vehicle depending upon the disposition of the elevating means which as shown in the drawings, may vary as to mechanical features.

What is claimed is:

1. In a materials working machine the combination of: a tractor vehicle for propelling said materials working machine, said tractor vehicle having a rearward portion; a pivot bearing means on said rearward portion; said pivot bearing means having a substantially vertical pivotal axis; a tongue structure mounted on said pivot bearing means to pivot about said pivotal axis; a roller frame having forward and rearward portions and disposed rearwardly relative to said tongue structure; said tongue structure being supported by said bearing means in cantilevered relation to said rearward portion of said tractor, whereby said tongue structure extends a substantial distance rearward relative to said pivot bearing means and provides support for the forward portion of said roller frame while permitting pivotal steering thereof by said tractor vehicle; link means pivotally interconnecting said tongue structure and said roller frame; said link means having pivotal connection means coupling said tongue structure to said roller frame at a position intermediate along the length of said roller frame; said pivotal connection means having pivotal axes disposed substantially horizontally and comprising first pivotal structure pivotally coupling said forward end of said link means with said tongue structure, said pivotal connection means further comprising second pivotal structure pivotally coupling said rearward end of said link means with said roller frame, said second pivotal structure disposed rearwardly in spaced relation to said forward portion of said roller frame; a material working roller means rotatably coupled to said roller frame on a substantially horizontal axis, said substantially horizontal axis disposed immediately rearwardly from the position at which said second pivotal structure couples said link means to said roller frame; said materials working roller means having peripheral structure disposed below said roller frame and adapted to bear upon the ground; weight means forward portion thereof, said forward portion of said roller frame spaced forwardly from said materials working roller means; elevating means coupled to said tongue structure and said forward portion of said roller frame, said elevating means adapted to selectively raise and lower said forward portion of said roller frame relative to said tongue structure and the ground; transport wheel structure rotatably mounted on said roller frame on a substantially horizontal axis; said transport wheel structure being disposed rearwardly relative to said materials working roller means; said transport wheel structure having peripheral means disposed to bear on the ground; said elevating means adapted to selectively raise said forward portion of said roller frame sufficiently to lift said materials working roller means to a position in which said peripheral structure thereof clears the ground whereby said rearward portion of said roller frame is carried by said transport wheel structure; said elevating means adapted to selectively lower said forward portion of said frame sufficiently to engage said peripheral structure of said materials working roller means with the ground and to further lower said forward portion of said roller frame until it is carried by said materials working roller means whereby said transport wheel structure is tiltably elevated, above the ground, about said axis of said materials working roller means; said elevating means adapted to selectively position said forward portion of said frame at an intermediate vertical position at which both said peripheral structure of said materials working roller and said peripheral structure of said transport wheel structure engage the ground simultaneously to effect serial working of the ground by said materials working roller and said transport wheel structure when said materials working machine is propelling by said tractor vehicle.

2. The invention as defined in claim 1 wherein said elevating means comprises hydraulic cylinder means mounted on said tongue structure and elevating linkage coupled between said hydraulic cylinder means and said forward portion of said roller frame.

3. The invention as defined in claim 1 wherein said elevating means comprises a winch mounted on said tongue structure and cable means operable by said winch and suspending said forward portion of said roller frame relative to said tongue structure.

* * * * *